US 6,526,135 B1

United States Patent
Paxson

(10) Patent No.: US 6,526,135 B1
(45) Date of Patent: Feb. 25, 2003

(54) AUTOMATED COMPETITIVE BUSINESS CALL DISTRIBUTION (ACBCD) SYSTEM

(75) Inventor: Dana W. Paxson, Rochester, NY (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/195,774

(22) Filed: Nov. 18, 1998

(51) Int. Cl.⁷ ................................................ H04M 3/42
(52) U.S. Cl. ............................ 379/218.01; 379/112.09; 379/265.01; 379/265.02
(58) Field of Search ...................... 379/265, 266, 379/309, 120, 121, 88.16, 88.18, 93.12, 112.09, 114.24, 218.01, 213.01

(56) References Cited

U.S. PATENT DOCUMENTS

| | | | | |
|---|---|---|---|---|
| 4,757,267 A | * | 7/1988 | Riskin | 379/114.24 |
| 4,839,919 A | * | 6/1989 | Borges et al. | 379/93.23 |
| 5,136,636 A | * | 8/1992 | Wegrzynowizc | 379/221.01 |
| 5,291,550 A | * | 3/1994 | Levy et al. | 379/242 |
| 5,530,774 A | * | 6/1996 | Charalambous et al. | 379/265 |
| 5,590,188 A | * | 12/1996 | Crockett | 379/225 |
| 5,680,448 A | * | 10/1997 | Becker | 379/221 |
| 5,787,160 A | * | 7/1998 | Chaney et al. | 379/220 |
| 5,850,433 A | * | 12/1998 | Rondeau | 379/218.01 |
| 5,864,617 A | * | 1/1999 | Donnelly | 379/266 |
| 5,884,032 A | * | 3/1999 | Bateman et al. | 709/204 |
| 6,088,444 A | * | 7/2000 | Walker et al. | 379/266 |
| 6,134,530 A | * | 10/2000 | Bunting et al. | 705/7 |
| 6,249,576 B1 | * | 6/2001 | Sassin et al. | 379/218.01 |
| 6,253,188 B1 | * | 6/2001 | Witek et al. | 705/14 |

* cited by examiner

Primary Examiner—Ahmad F. Matar
Assistant Examiner—Bing Bui
(74) Attorney, Agent, or Firm—Withrow & Terranova, PLLC

(57) ABSTRACT

The ACBCD distributes calls for business service in a given business category to competing businesses on the basis of proportionate shares allocated to the individual competitors, all without ongoing manual intervention in the allocation process. The distribution process takes one of several forms, all of which guarantee any competitor in a given business category a minimum competitive share of the incoming calls for business service. The invention provides a means for each competitor in a given business category to raise or lower its own expected relative share of the incoming calls, subject to constraints imposable by the supplier of the invention's call-distribution service. This invention is useful in many communication networks, including and not limited to the traditional PSTN 10, in the Internet and World Wide Web, or in any mixture of these technologies.

19 Claims, 5 Drawing Sheets

AUTOMATED COMPETITIVE BUSINESS CALL DISTRIBUTION (ACBCD) SYSTEM

BACKGROUND

This invention relates in general to call distribution systems and, in particular, to a system for distributing task requests to a group of task performers in relative frequencies selected by the task performers.

Currently, a caller unfamiliar with the businesses offering a particular desired service must initiate a dialog with a directory-assistance operator. The operator must then use a business-category form of database search to supply a candidate set of listings. The operator must then select one or more listings from this candidate set to quote to the caller under restrictive practice rules that insure fairness in call distribution among the businesses competing in the same category as requested by the caller. This process is labor-intensive and time-consuming, and depends completely on the operator's implementation of the practice for fairness and efficiency. There is no just provision for a business to increase or decrease its expected share of the listing quotations.

SUMMARY

The invention eliminates operator involvement in designated high-volume categories of this type of call, and has the following advantages over current systems:

1. The invention offers to its subscription providers, the telecommunications companies, the opportunity for revenue from such automated calls, and the opportunity for revenue from ongoing subscriptions to the service by competing businesses.
2. The invention offers to its subscription providers, the telecommunications companies, the opportunity for reduction of the number of directory-assistance calls requesting listings for the most-frequently-called business services. This reduction translates directly to a reduction in cost of furnishing directory-assistance service.
3. By supplying to the callers the opportunity to select, with minimum effort, a business service from those participating in the subscription service, the subscription provider's use of the invention places competitive pressure on all business services in a subscribable category to subscribe.
4. The invention offers to subscribing businesses a process for altering, within predefined limits and under predefined constraints, their expected proportion of the total number of calls received within a given business category, at a cost settable by the subscription provider.
5. The invention also offers to the subscribing businesses the ability to set dynamically the terms under which they will accept calls.
6. The invention offers to the callers the advantages of enhanced services incorporated in such calls: instant selection of a subscribing business service supplier, selection of a geographically-proximate supplier, potential for added selection criteria to restrict choices further, and extended dialog concerning a selected supplier's detailed services.

DEFINITIONS

The terms 'competitor' and 'subscriber' are used here to mean one of several businesses subscribing to the service defined by this invention, and falling within the range of competition as defined by business category, geographic area, caller location, and other distinguishing criteria as specified herein.

The term 'subscription provider' (SP) is used here to mean the telecommunications or other company providing the subscription service to businesses requesting participation in ACBCD for one or more categories of business.

The terms 'category' and 'business category' are used in the same sense here to mean a class of business as defined in commonly-accepted business classification schemes in use by telephone companies and other service providers.

The term 'domain' (more formally, 'global category domain') is used here to mean a subclass of business defined by geographic or other qualifications which restricts the set of matching listings to a subset of the set matching a given general business category. The caller's identifying information, the time of day, the day of week, and other data elements may be included in these qualifications. The number and status of previous attempts to connect to the subscriber on the same call must be included in these qualifications, to allow elimination of a previously-quoted listing from repeated attempts to connect.

The term 'call' is used here to mean a request for service from a specific domain.

The term 'caller' is used here to mean an individual requesting service from a subscriber in a particular domain.

DETAILED DESCRIPTION

Figure 1:
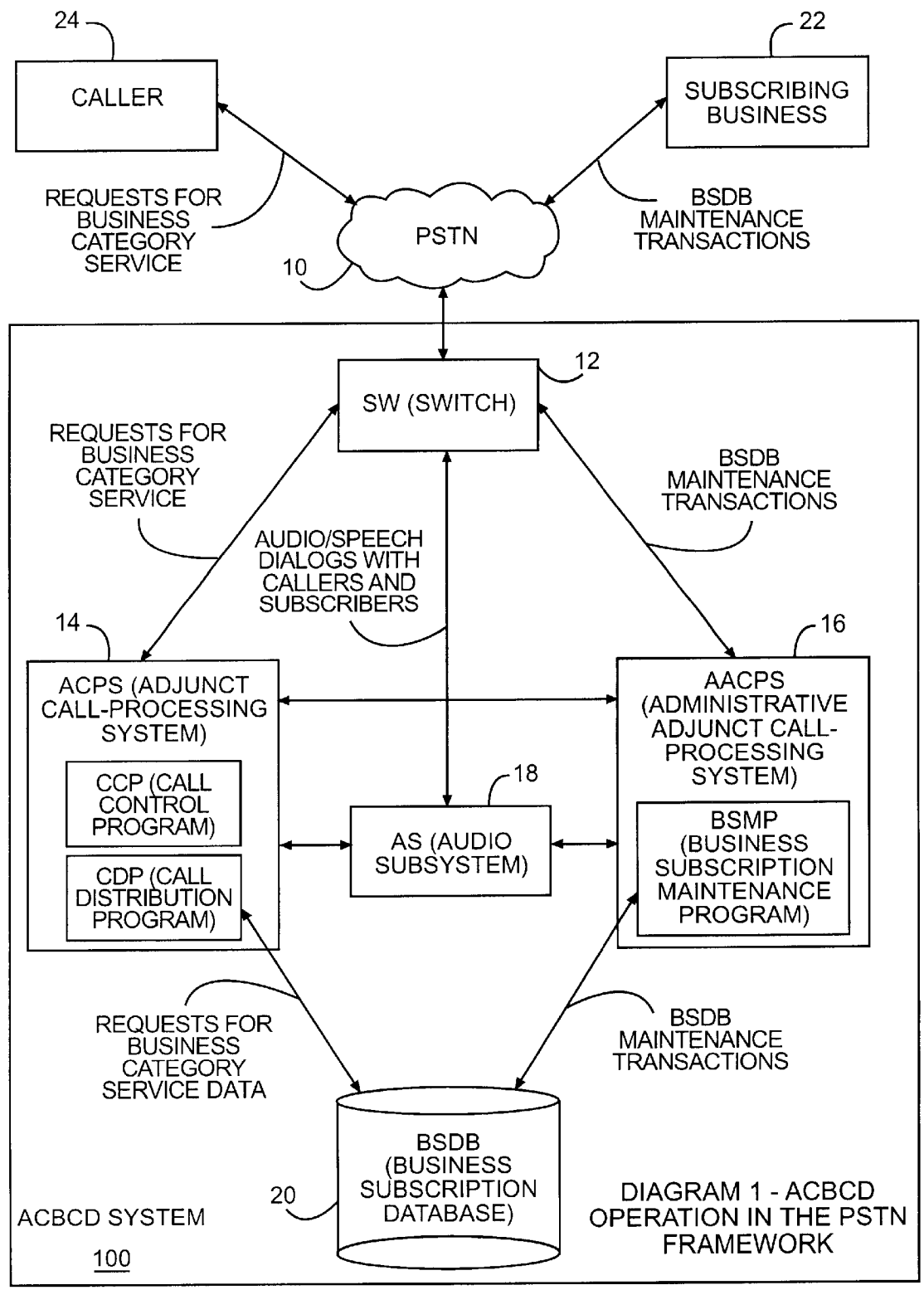
FIG. 1 is schematic view of the invention in a public switched telephone network.
Figure 2:
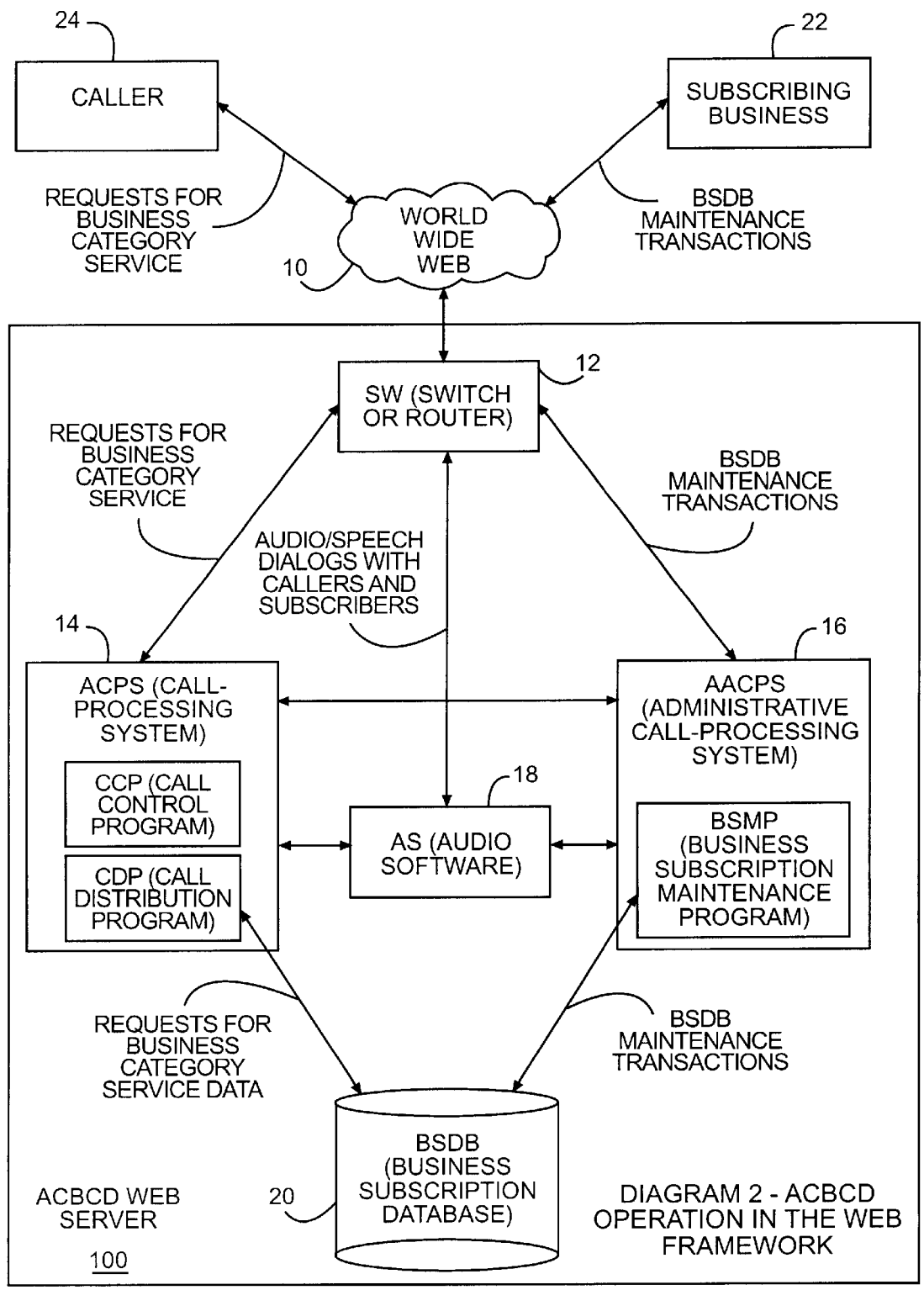
FIG. 2 is schematic view of the invention in an Internet network, in particular the World Wide Web.

FIG. 1 illustrates a single form of the ACBCD 100 in a PSTN 10 infrastructure. The PSTN 10 connects via a switch SW 12 to an adjunct call-processing system ACPS 14, an administrative adjunct call-processing system AACPS 16, and an audio subsystem AS 18. The ACPS 14 and the AACPS 16 are connected to a business subscription database BSDB 20 containing the names, business categories and other subscription information for the businesses subscribing to the ACBCD 100. Both the ACPS 14 and the AACPS 16 are also connected to the AS 18. A subscribing business 22 connects to the AACPS 16 via the PSTN 10 or direct communications network connections. A caller connects to the PSTN 10 and the BSDB 20 through a conventional analog or digital telephone with either a wire line service or a wireless service.

Those skilled in the art understand that the switch SW 18, ACPS 14 and the AACPS 16 are sophisticated computer-based systems. Each has a central processing unit, memory units in the form of random access memory and read only memory.

Each likewise has stored operating system and application programs for carrying out their respective functions.

BSDB 20 includes supporting access software and contains, though not necessarily restricted to, the names and categories of subscribing businesses 22, along with the subscriber's level or size of subscription and any geographical and other domain-restrictive criteria to be applied to the callers' requests for business service. A software program (call distribution processing, or CDP), is resident either in the telephone switch SW 12, in the ACPS 14, or in a Web server, consisting of a set of call-distribution algorithms as defined in detail herein. A software program (call control processing, or CCP), resident either in the telephone switching system itself SW 12 or the ACPS 14, or in a Web server, conducts call-control coordination necessary to activate an automated audio dialog with the caller, access the business subscription database, execute the call-distribution software program, transfer the call to the selected business, produce a billing record for the call if required, and produce a statistics record for offline compilation and analysis by the service provider.

A software program (business subscription maintenance program, or BSMP), resident either in the telephone switching system itself or in an adjunct administrative call-processing system (AACPS 16), or in a Web server, conducts a dialog with any subscribing business. The BSMP allows the business subscribers 22 to: (1) access the BSDB 20 to initiate and terminate subscription to the service, (2) specify the desired business categories, (3) specify the desired level or size of the subscription, and (4) specify any geographical and other restrictive criteria. The network infrastructure, including: (optionally) the public switched telephone network (PSTN 10), the switch itself (SW) and its internal computing subsystems; and the Internet and the World Wide Web. The network infrastructure includes connections to the caller 24, the adjunct call-processing system ACPS 14, the subscribing businesses 22, the adjunct administrative call-processing system AACPS 16, and, optionally, the audio subsystem AS 18. The ACBCD 100 optionally uses the audio subsystem AS 18 with speech-recognition capability that is able to recognize the names of the required business categories as spoken by any caller.

Business Service Call Processing

Embodiment A

Figure 3:
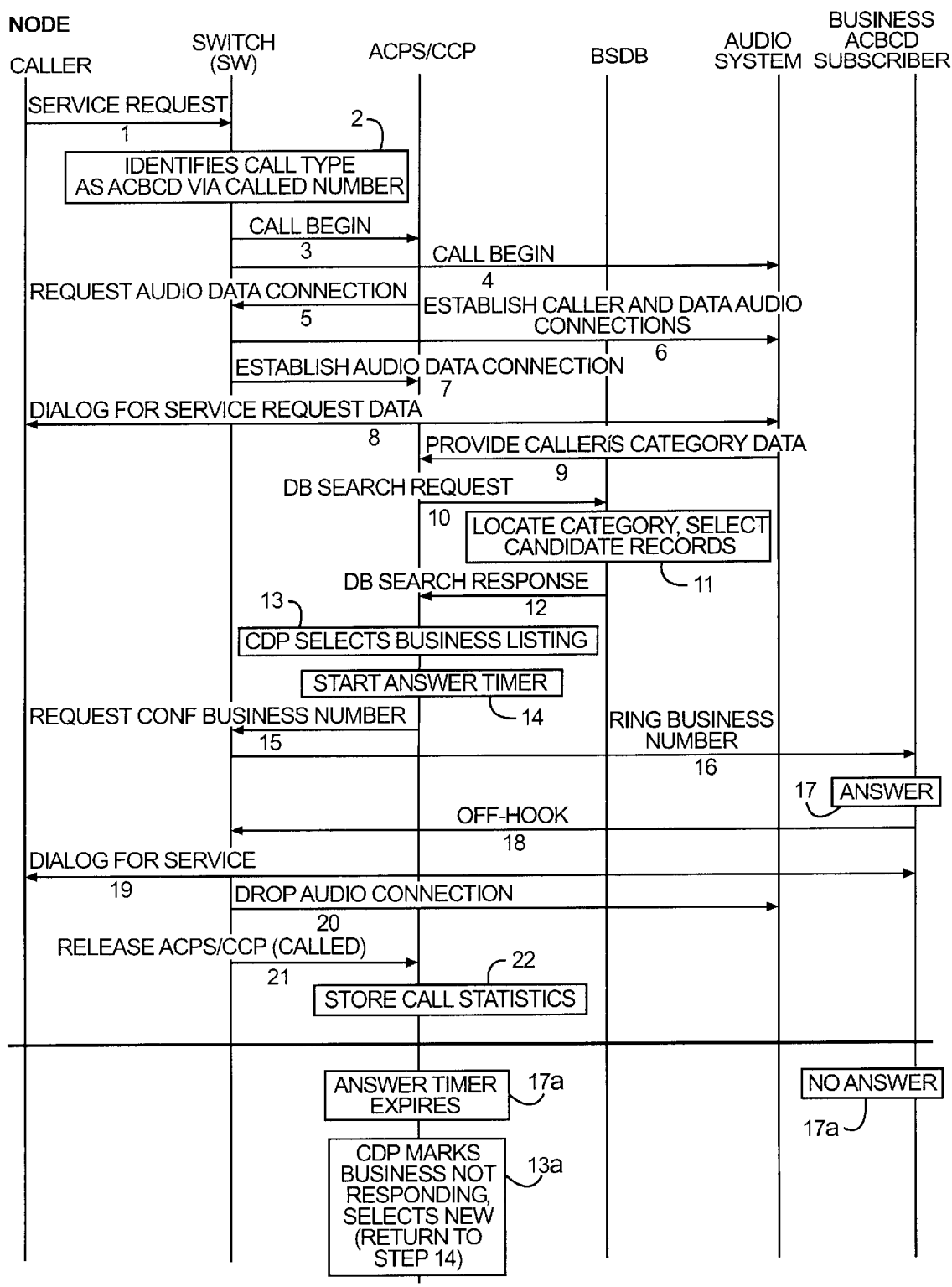
FIG. 3 is a call flow diagram of how a call using the invention is handled in a PSTN network

FIG. 3 is a message flow diagram for a typical call.

In one form of the invention, the SW 12 and ACPS 14 are one system. With reference to FIG. 3, a typical call on ACBCD 100 operates as follows:

1. The caller initiates a call to a directory service number which offers ACBCD service.
2. The switch SW 12 providing the ACBCD service signals the AS 18 and the ACPS 14 that an ACBCD call is beginning. The SW 12 supplies the caller's ANI to both the AS 18 and the ACPS 14.
3. The SW 12 activates a voice link to the AS 18. The ACPS 14 activates a data link to the AS 18.
4. The AS 18 conducts a dialog with the caller to determine the desired category of business service, and the caller's geographical and other restrictive criteria for business selection.
5. The AS 18 sends the caller's category and other criteria to the ACPS 14.
6. The ACPS 14/CCP searches the BSDB 20 for subscribing businesses.
7. The CCP selects only those candidate business listings for which the business is a subscriber to the ACBCD.
8. The CCP invokes the CDP to select a single business listing.
9. The ACPS 14/CCP conferences in the selected business number, and rings that number.
10. If the business answers, the ACPS 14/CCP drops off the call; the caller then continues with the business transaction originally sought. Completion of the call as in this step enables charging the call to the caller, as for directory assistance call completion.
11. If the business fails to answer, the ACPS 14/CCP returns to invoke the CDP again (Step 8) excluding the business failing to answer from the selection process.
12. If in any of these steps there result no listings returned for selection, the ACPS 14/CCP signals the AS 18 to report this result to the caller and optionally request any possible changes in the category or other criteria (Step 4).

Embodiment B

In a different form of the invention, the SW 12 and ACPS 14 do not co-reside, but the process as described above operates in the same manner, with the addition of an intersystem path between the SW 12 and the ACPS 14 which is now resident in the ACPS 14.

Embodiment C

In a different form of the invention, otherwise the same as Embodiment A, the dialog the AS 18 conducts with the caller intersperses caller dialog with searches of the BSDB 20, thereby providing immediate feedback concerning the validity of the caller's category and other desired criteria, at some cost in increased database access traffic. The following process applies:

1. The caller initiates a call to a directory service number which offers ACBCD service.
2. The switch SW 12 providing the ACBCD service signals the AS 18 and the ACPS 14 that an ACBCD call is beginning.
3. The SW 12 activates a voice link to the AS 18. The ACPS 14 activates a data link to the AS 18.
4. The AS 18 conducts a dialog with the caller to determine the desired category of business service.
5. The AS 18 sends the caller's desired business category to the ACPS 14.
6. The ACPS 14/CCP searches the BSDB 20 for subscribing businesses, and returns the results to the AS 18.
7. The AS 18 conducts a dialog with the caller to determine the desired geographical and other restrictive criteria to be applied to the search.
8. The AS 18 sends the caller's desired criteria to the ACPS 14/CCP.
9. The ACPS 14/CCP searches the BSDB for candidate business listings, invokes the CDP to select a single business listing, and returns the results to the AS 18.
10. The ACPS 14/CCP conferences in the selected business number, and rings that number.
11. If the business answers, the ACPS 14/CCP drops off the call; the caller then continues with the business transaction originally sought. Completion of the call as in this step enables billing of the call to the caller, as for directory assistance call completion.
12. If the business fails to answer, the ACPS 14/CCP returns to invoke the CDP again (Step 9), excluding the business failing to answer from the selection process.
13. If in steps 9 or 12 there result no listings returned for selection, the ACPS 14/CCP signals the AS 18 to report this result to the caller and request any possible 25 changes in the category or other criteria (Steps 4). In the absence of a desired category, the caller may be offered connection to a Directory Assistance operator.

Embodiment D

In a different form of the invention, otherwise the same as Embodiment C, the SW 12 and ACPS 14 do not co-reside, but the process as described above operates in the same manner, with the addition of an intersystem path between the SW 12 and the ACPS 14 which is now resident in the ACPS 14.

Embodiment E

In a different form of the invention, otherwise the same as Embodiment A, the SW 12, ACPS 14, AACPS 16 and AS 18 all co-reside in the same system.

Embodiment F

In a different form of the invention, otherwise the same as Embodiment C, the SW 12, ACPS 14, AACPS 16 and AS 18 all co-reside in the same system.

Embodiment G

In a different form of the invention, otherwise the same as Embodiment A, the AS 18 does not exist, and the dialogs are carried out with a directory assistance telephone operator.

Embodiment H

In a different form of the invention, otherwise the same as Embodiment A, the SW 12, ACPS 14, AACPS 16 and AS 18 all co-reside in one or more interconnected Web servers, and all requests for service communicate with those servers. Diagram 2 shows the most compact form of this arrangement, with a single Web server containing all of these functions.

In all forms of this invention, the location of the BSDB in relation to the SW 12, the ACPS 14, the AACPS 16 and the AS 18 is unspecified, and may be in any of these systems as motivated by relative resources and system requirements. The invention, in all combinations of co-residency of the systems, subsystems, software and databases, and in all mixtures of PSTN 10 and Internet 10 infrastructure, functions in essentially the same fashion. The co-residency or non-co-residency of any combination of the specified components is not an essential characteristic of the invention. The AS 18 may use voice recognition, DTMF recognition, or other forms of signaling in processing responses from the caller. The form of recognition of caller signals is not an essential characteristic of the invention.

Call Distribution Processing (CDP)

The invention's distribution of calls meets one essential criterion: given a statistically-significant number of callers specifying the same business category and other distinguishing criteria, a given listing meeting those criteria will be quoted to those callers with a frequency which is controllably biased, so that different listings meeting those criteria have a predictable and controllable statistical expectation of receiving specific, relatively larger or smaller numbers of calls.

Following is the form of call distribution processing used in the invention.

Call Distribution Processing (Category-Weighted)

Each business, for each business category for which it wishes to supply service, has a weighting domain as part of its subscription to the ACBCD. When a call arrives within a given category, the CDP:

1. Assembles a map of the businesses in the category, each with its weighting domain and its domain boundaries with the other businesses assembled in that category. The map excludes all 'gaps' between weighting domains, i.e., every location ('point') in the map falls within some subscriber's weighting domain. The resulting composite map of all weighting domains in a category is here termed the 'global category domain'. For the details of the process of selecting a specific business, see Service Allocation, below.
2. Computes the size of, and boundaries within the global category domain.
3. Independently generates a pseudorandom number, uniformly distributed across an interval the points of which map one-to-one onto the points of the global category domain, such that, given the limitations of the pseudorandom number generation process, a specific, uniformly-distributed location in the global category domain is determined. The details of this determination process are elaborated further in the section titled Determination Of Global Category Domain Location.
4. Selects for quotation the business listing in whose weighting domain the specific generated location falls.
5. Produces a billing record for the subscribing business whose listing is selected.
6. Produces a billing record for the caller's use of the service.

In another realization of the invention, the CDP may assemble and store the map on a schedule asynchronous from that of the call, and do no more than access the stored map at the time of the call.

In the simplest realization of the CDP's mapping process, the term 'domain' here refers to a simple range of integers, the 'map' to a list of the category's subscribers with all subscriber domains mapped contiguously, each 'domain boundary' to the integer value between any two entries in the list, and the 'location' to a single value generated within the range of integers. This is a discrete realization of the space.

Using integer values produces the simplest realization described above: a global category domain consisting of an integer-length line segment, with each weighting domain defined as an integer-length subsegment of that line segment, with the ratio of subsegment length to segment length approximately equal to the relative weight of that weighting domain. These are all discrete realizations of a global category domain. Using real values instead of integers produces a continuous realization of a global category domain.

Other realizations of the weighting process utilize other forms of mapping which preserve the essential criterion of the invention's CDP; they amount either to additional reapplications of the pseudorandom-number generation process, or to shifting of that process to a different stage of the mapping to achieve equivalent results, or to both reapplications and shifting of that process.

Business Subscription Call Processing (BSCP)

To establish and maintain the lists of subscribing businesses in specific categories, together with their weighting domain size in each subscribed category, the invention provides for dialog between the subscribing business and the AACPS 16. This dialog is carried out using the normal audio-response and speech-recognition capabilities of the AS 18, and results in the addition- change or deletion of business subscribers, their categories and other criteria for selection, and the weighting domains they use. In a variation of this invention, the BSCP dialog may be carried out through a user terminal interface available to the business subscribers.

Business Service Maintenance Processing (BSMP)

As part of its subscription to the ACBCD, each business, for each business category for which it wishes to supply service, requests a share of the business of that category. The BSMP translates that request into a weighting domain definition. The size of this weighting domain relative to the sizes of competing weighting domains furnishes to the subscriber the ability to acquire a larger or smaller share of the calls. This is analogous to the purchase of a larger or smaller published advertisement for the business, but produces far-more-direct results.

The following process applies:

1. The BSMP dialogs with the subscriber to obtain category data, other criteria such as geographic and time and date restrictions of service, and desired category weighting.
2. The BSMP, if directed by SP-established parameters, translates the subscriber's desired category weighting to an internally-used weighting domain.
3. The BSMP stores the weighting domain and the other selection criteria translated from the subscriber request into the BSDB.

4. The BSMP transfers the stored data from its own instance of the BSDB to the ACPS 14 BSDB for use by the CDP during call processing of requests for business service in the specified category.

The company providing subscriptions for businesses (the SP) controls the ways in 10 which the request from the subscribing business may be translated into a weighting domain. As selected by the subscription provider for a given category of business, the invention applies one of the following translation processes in the BSMP:

Stepped Weight Specification

The BSMP offers the calling subscriber one or more levels of service for a specific business category, each of which corresponds to a specific relative weight domain.

The subscriber may select any one of the offered levels of service, or reject inclusion in the category. The higher the level of service selected by the subscriber, the larger the weight domain the BSMP assigns to the subscriber for use during CDP, and the larger the subscriber's expected percentage of the calls for the category. The availability of only one level of service means that all subscribers receive the same weight domain size.

The actual mapping of service level to weight domain is done through the use of a table matching each identifier of a level of service to the values defining the size of the weight domain. The requested service level is matched against the entries in the table, and the weight domain corresponding to the matching entry is selected.

Direct Weight Specification

The BSMP offers the calling subscriber a display or narration of the relative sizes of the current weight domains of all competitors in a specific business category. The subscriber may specify the desired weight domain size directly, or reject inclusion in the category. The larger the weight domain specified by the subscriber, the larger the weight domain assigned to the subscriber for use during CDP, and the larger the subscriber's expected percentage of the calls for the category.

Biased Weight Specification

The BSMP offers the calling subscriber a display or narration of the relative sizes of the current weight domains of all competitors in a specific business category. The subscriber may specify the desired weight domain size directly, or reject inclusion in the category. The ;BSMP then applies biases to- the specified weight, translating it in one or more of the following ways:

1. Any weight domain specified below a given minimum size is increased to the minimum size, guaranteeing at least a minimum level of service relative to competing subscribers.
2. Any weight domain specified above a given maximum size is decreased to the maximum size, guaranteeing at most a maximum level of service relative to competing subscribers.
3. Any weight domain specified between the minimum and the maximum is mapped to a new weight domain on a continuous, monotonic, but not-necessarily-uniform basis. This mapping may be any continuous, monotonically-increasing mathematical function which maps both widely-spread requested weight domain sizes into a narrower weight domain size interval ('concentration'), and highly-concentrated weight domain sizes across a wider weight domain size interval ('spread'). This facilitates making clearer distinctions between competing subscribers' domains, and facilitates more uniform use of the domain space.
4. Any weight domain's boundaries may be 'rounded' to integer or other discrete values, simplifying the processing of domain-boundary testing, and the relative ranking of different subscribers' domain sizes.

As in the case of direct weighting, the larger the weight domain specified by the subscriber, the larger the weight domain assigned to the subscriber for use during CDP, and the larger the subscriber's expected percentage of the calls for the category. In the biased-weighting case, the BSMP must give the subscriber a clear picture of the biasing process and its rules, and the outcome of the processing of the subscriber's weighting domain size requests.

The BSMP supplies price schedules to the subscriber for all choices available, determines charges to be billed to the subscriber for all subscription choices made and committed, and determines charges, if any, to be billed to the subscriber for all caller connections made. The BSMP also produces billing records for ongoing subscriptions.

Illustrations

Caller Interaction With Service

In the dialog below, the normal text indicates either human speech or routine automated announcements. The italic text indicates variable announcement content. The bold italic text indicates business subscriber branding content.

The caller 24 wants to call a taxi, but no telephone directory is available. She calls the service number for ACBCD.

1. An automated announcement (from the AS 18) says: "You have reached the Voice Yellow Pages (or some such branding). Please say in one word what business service you want."
2. Caller: "Cab."
3. AS 18: "You have asked for taxi service. Please say 'yes' if that is correct."
4. Caller: "Yes."
5. AS 18: "A taxi operator is being selected from those available. For a charge of seventy-five cents, you may be connected to the taxi operator directly. Please say 'yes' or swipe your phone card if you wish to have that connection made."
6. Caller: "No."
7. AS 18: "The Garbo Cab Company, 630-555-GARBO, has been selected, with express service between downtown Chicago and O'Hare Airport at any hour of any day. The number is 630-555-4272. Again, the number is 630-555-4272."
8. Caller: (hangs up and calls the Garbo Cab Company)

If the caller accepts the charge for the connection, Step 6 would be:

6a. Caller: "Yes."
7a. AS 18: "Please deposit seventy-five cents, or swipe your phone card to complete the call."
8a. Caller: (swipes card)
9a. AS 18: "Thank you. The Garbo Cab Company, 630-555-GARBO, has been selected, with express service between downtown Chicago and O'Hare Airport at any hour of any day." (during this announcement, the Garbo Cab Company is conferenced into the call, and is given the ANI and caller ID of the phone from which the call has been made)
10a. Garbo Cab: "This is Garbo Cab Company. I see you are calling from the Foobar Rent-a-Car lot at O'Hare. How may we help you?" (The AS 18 drops off the call on successful completion)

The rest of the conversation might go as follows:

11a. Caller: "Some idiot at Foobar gave my car to somebody else, and they don't have any more cars. I need a cab right now to get me to the John Hancock Building downtown."
12a. Garbo Cab: "I'll have one at your phone in five minutes."

If the caller had not received an answer for a certain length of time, or had received a busy signal at Step 9a, the AS 18 would have reinitiated dialog at Step 5, optionally eliminating any second or subsequent solicitations-for call completion:

5a. AS 18: "The selected taxi operator is not available to take your call. Another taxi operator is being selected from those available."

The dialog continues from Step 7 or Step 7a above.

An Alternate Realization Of The Invention

This realization of the invention does not require the caller to specify the category of business, except by dialing a number which activates the call distribution process for a single predefined category. The SP would assign easily-identifiable numbers for business service categories receiving high call volume, such as taxi services, food delivery services, express couriers and others serving large metropolitan areas.

The principal example described above would be simplified. The situation is the same: The caller wants to call a taxi, but no telephone directory is available. She remembers the service category number 1-630-555-TAXI and dials it.

1. AS 18: "A taxi operator is being selected from those available. For a charge of seventy-five cents, you may be connected to the taxi operator directly. Please say 'yes' if you wish to have that connection made."
2. Caller: "No."
3. AS 18: "The Garbo Cab Company, 630-555-GARBO, has been selected, with express service between downtown Chicago and O'Hare Airport at any hour of any day. The number is 630-555-4272. Again, the number is 630-555-4272."
4. Caller: (hangs up and calls the Garbo Cab Company)

By eliminating the added service category dialog as shown, the complexity and cost of the audio speech recognition system required can be reduced or eliminated altogether, at the cost of educating callers via advertising to know the special service category numbers needed. The education of callers to use the special service category numbers can be performed in part during the dialog between the AS 18 and the caller in the original dialog, viz. (the different content in this dialog is shown in boldface):

The caller wants to call a taxi, but no telephone directory is available. She calls the general service number for ACBCD.

1. An automated announcement (from the AS 18) says: "You have reached the Voice Yellow Pages (or some such branding). Please say in one word what business service you want."
2. Caller: "Taxicab."
3. AS 18: "You have asked for taxi service. Please say 'yes' if that is correct."
4. Caller: "Yes."
5. AS 18: "The next time you want to get a taxi service number, you can call 630-555-TAXI directly. A taxi operator is being selected from those available. For a charge of seventy-five cents, you may be connected to the taxi operator directly. Please say 'yes' if you wish to have that connection made."

The call continues as before, but in this case the caller has been prompted to remember a simple phrase (630-555-TAXI) that will facilitate use of the predefined category number in future calls. The number of text-translated digits may be as many or as few as may be practical and available, e.g., 630-TAXICAB may be available for the taxi service number, and is more attractive for human memorization and use.

Determination Of Global Category Domain Location

To reiterate, "[The CDP] independently generates a pseudorandom number, uniformly distributed across an interval the points of which map one-to-one onto the points of the global category domain, such that, given the limitations of the pseudorandom number generation process, a specific, uniformly-distributed location in the global category domain is determined."

This requires further explanation to clarify the following points:

1. How is the mapping from the pseudorandom number interval to the global category domain accomplished?
2. What is meant by "limitations of the-pseudorandom number generation process?"

Point 1: Mapping To The Global Category Domain (GCD)

The invention may use one of the following methods. The mapping can be done either by using a list of discrete point translations, by using a discrete point translation function, or by using a 'continuous' function. The discrete-point approaches apply directly in computer applications. The 'continuous-function' approach, to work in a computer application, generates and uses values which must be discrete within the computer system's limits of accuracy, but may produce values which fall between values used in defining the boundaries of and within the global category domain. The use of the term 'continuous' here is inaccurate, strictly speaking, but conveys the notion of 'between'-ness, which is irrelevant in the discrete mappings.

Discrete Mapping Using A List Of Point Translations

Once the GCD is defined, a list of all its points is produced. To each entry on the list, a unique value in some key space is assigned, such that when all of the GCD's points have been assigned values (point coverage), no value in the chosen key space remains unassigned (key-space coverage), and the assignments are in a one-to-one correspondence, point to keyspace value. The pseudorandom-number generation process produces a uniformly distributed value mappable one-to-one onto that same key space. The list entry corresponding to the generated value carries the identity of some unique point of the GCD.

Discrete Mapping Using A Point Translation Function

This process is the same as in the previous paragraph, except that the assignment of a unique value in key space is performed according to some rule preserving the point coverage, key-space coverage, and one-to-one correspondence properties. The use of a list is then no longer necessary; application of the rule to a given generated pseudorandom value yields a unique location in the GCD.

Continuous Mapping

This process generates pseudorandom values which do not necessarily map directly onto identified points in the GCD. Further, the selectable points in the GCD may include points 'between' identified points within a weight domain, on the boundary between two weight domains, or on the boundary of the GCD itself.

The invention uses the following method of GCD point selection:

1. Determine the range of coordinate values necessary and sufficient to span all GCD points in the GCD.
2. Generate one pseudorandom number uniformly distributed across the interval's determined range of values.
3. Using the generated number, determine a point in the GCD interval.
4. Determine which weighting domain the point falls in. This test must be based on the definitions of the boundaries of the weighting domains. Each point in the GCD interval must belong to exactly one subscriber; for convenience, we may assume that the intervals are closed at their lower ends, and open at their upper ends. The opposite assumption is equally acceptable.

5. Report the selected weighting domain.

Point 2: Limitations Of The Pseudorandom Number Generation Process

To insure fair selection of a weighting domain, it is important that the pseudorandom numbers generated pass generally-accepted tests for randomness. The limitations of such tests are that they cannot absolutely guarantee randomness; even the best generation processes have some weaknesses in this respect. The limitations of the tests translate into limitations on the level of fairness to be expected from the weighting domain selection process. The more rigorous the tests passed by the generation process, the fairer the selection process can be expected to be.

Service Allocation

Overview

Figure 4:
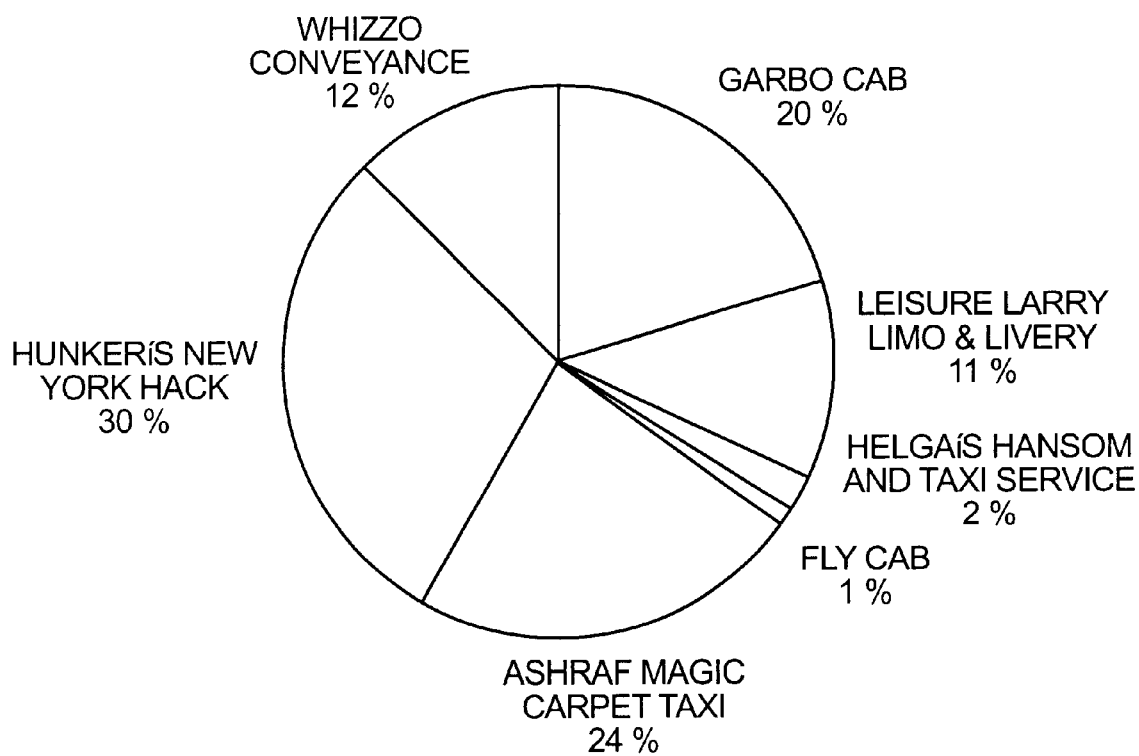
FIG. 4 is a pie chart showing an example of call distribution shares.

FIG. 4 shows a conceptual view of one way in which the competing businesses may be mapped onto a global category domain, and of how the callers for that category are allocated to specific points in that domain. This example domain is a fictional 24-hour taxi service domain for LaGuardia Airport. The percentages show, for each named cab company, what percentage of incoming calls for LaGuardia taxi service will be allocated to the named company.

In this example, Fly Cab has the guaranteed minimum percentage of the shares; based on the pseudorandom call distribution process, this company will receive one in one hundred calls in this category domain, which may be all that the company is willing or able to serve. Hunker's New York Hack has bought into the maximum of forty shares (equating at this point to 30% of all shares), to get the highest proportion of all calls to the service in this domain. The SP may adjust the maximum and minimum percentages as needed, charging accordingly, based principally on the number of competitors applying in the domain and the need to maximize its own service revenues.

Changes To The Allocation

If the number of competitors expands, the shares of all existing competitors must be adjusted downward to permit continued fair allocation of shares; the addition of twenty one-percent competitors to the above share distribution must proportionately reduce the shares of all those already in the distribution. To see how this works, assume that the above breakdown arose from the following table of shares:

| Company | Shares | Percentage |
|---|---|---|
| Garbo Cab | 27 | 20% |
| Leisure Larry Limo & Livery | 15 | 11% |
| Helga's Hansom And Taxi Service | 3 | 2% |
| Fly Cab | 1 | 1% |
| Ashraf Magic Carpet Taxi | 33 | 24% |
| Hunker's New York Hack | 40 | 30% |
| Whizzo Conveyance | 16 | 12% |
| Total | 135 | 100% |

If ten new one-percent competitors subscribe to the service, and no other adjustments to shares are made, the percentages will change as follows:

| Company | Shares | Percentage |
|---|---|---|
| Garbo Cab | 27 | 19% |
| Leisure Larry Limo & Livery | 15 | 10% |
| Helga's Hansom And Taxi Service | 3 | 2% |
| Fly Cab | 1 | 1% |
| Ashraf Magic Carpet Taxi | 33 | 23% |
| Hunker's New York Hack | 40 | 28% |
| Whizzo Conveyance | 16 | 11% |
| Newbie #1 | 1 | 1% |
| Newbie #2 | 1 | 1% |
| Newbie #3 | 1 | 1% |
| Newbie #4 | 1 | 1% |
| Newbie #5 | 1 | 1% |
| Newbie #6 | 1 | 1% |
| Newbie #7 | 1 | 1% |
| Newbie #8 | 1 | 1% |
| Newbie #9 | 1 | 1% |
| Newbie #10 | 1 | 1% |
| Total | 145 | 100% |

It is worth noting that if the number of competitors rises to the point where the minimum share rounds to zero percent instead of one percent, either the minimum share must be uniformly raised, and all share divisions above that level adjusted accordingly; or the minimum share can be redefined as a fractional percentage.

Figure 5:
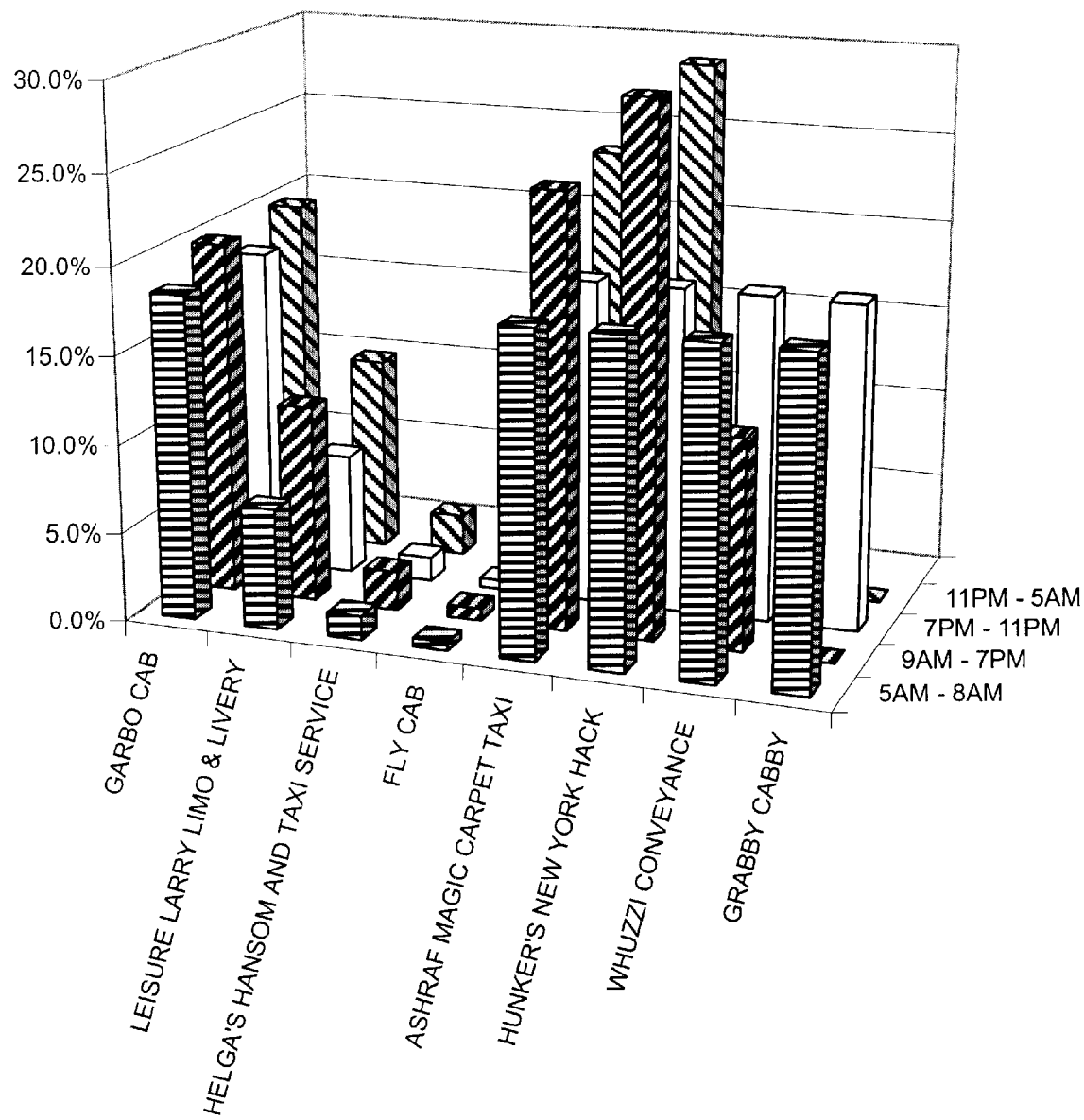
FIG. 5 is a chart showing distribution along multiple dimensions.

A More Complex Domain The above example assumes a simple division of a single domain into percentages for all subscribing competitors. The same domain may be defined differently for different sets of added criteria. Using the above example, suppose that a specific time and date range is of special interest to certain competitors; they want to provide added service during the early weekday mornings and the late weekday evenings, when many heavily-used business flights arrive and leave the airport. To do this, a new global category domain is defined, say, for Monday through Friday, 5AM–8AM and 7PM–11PM, adding time/date to the domain space as a dimension. To visualize this becomes more difficult, but it is still capable of two-dimensional depiction. See FIG. 5.

While Helga's and Fly Cab work around the clock, constrained in this example by limits on the numbers of cabs they can deploy, Grabby Cabby ignores the less-lucrative periods of the day and swings large-scale resources into play during the busy times. Given the ceiling on the shares that can be purchased, the effect is to deprive the other larger competitors of their dominance during the busy periods. This illustration shows that the invention is capable of addressing different business strategies for competing subscribers to the ACBCD service. The table of call distribution percentages is as follows (note the addition of one decimal of percentage breakdown):

| Company | 5AM–8AM | 9AM–7PM | 7PM–11PM | 11PM–5AM |
|---|---|---|---|---|
| Garbo Cab | 18.3% | 20.0% | 18.3% | 20.0% |
| Leisure Larry Limo & Livery | 6.8% | 11.1% | 6.8% | 11.1% |
| Helga's Hansom And Taxi Service | 1.4% | 2.2% | 1.4% | 2.2% |
| Fly Cab | 0.5% | 0.7% | 0.5% | 0.7% |
| Ashraf Magic Carpet Taxi | 18.3% | 24.4% | 18.3% | 24.4% |
| Hunker's New York Hack | 18.3% | 29.6% | 18.3% | 29.6% |
| Whizzo Conveyance | 18.3% | 11.9% | 18.3% | 11.9% |
| Grabby Cabby | 18.3% | 0.0% | 18.3% | 0.0% |

Given the above domain, here is how the mapping described in the invention works. When a call arrives, the system obtains the current time of day and day of week, generates a pseudorandom number between 0 and 999 inclusive, and looks up that number in a cumulative list of the percentages that apply during the selected time interval (we assume that the time intervals and the listed percentage intervals are closed at their starts and open at their ends, so that 5AM falls in the 'prime-time' period, and 8AM falls in the normal period). The company corresponding to the matching entry in the list is then selected, and the call completed. If the company cannot offer service, the selection process is attempted again until another company is selected. Here is the cumulative table:

| | Cumulative | | | |
|---|---|---|---|---|
| Company | 5AM–8AM | 9AM–7PM | 7PM–11PM | 11PM–5AM |
| Garbo Cab | 18.3% | 20.0% | 18.3% | 20.0% |
| Leisure Larry Limo & Livery | 25.1% | 31.1% | 25.1% | 31.1% |
| Helga's Hansom And Taxi Service | 26.5% | 33.3% | 26.5% | 33.3% |
| Fly Cab | 26.9% | 34.1% | 26.9% | 34.1% |
| Ashraf Magic Carpet Taxi | 45.2% | 58.5% | 45.2% | 58.5% |
| Hunker's New York Hack | 63.5% | 88.1% | 63.5% | 88.1% |
| Whizzo Conveyance | 81.7% | 100.0% | 81.7% | 100.0% |
| Grabby Cabby | 100.0% | 100.0% | 100.0% | 100.0% |

Thus, if the call arrives in the system at 9:15AM, and the number generated is 646 (converting to 64.6%) the selected subscriber will be Hunker's New York Hack, since its range of 58.5–88.1% straddles the generated value for the selected time interval.

Further Extension

Although depiction would be cumbersome, the invention accepts further breakdowns of the domain space, for example, a taxi service concentrating on only a few airlines and excluding others. Such breakdowns require sufficient dialog with callers for service to allow distinguishing the global category domain to be used.

Verification

The assurance that calls are being allocated fairly must be obtained through maintenance and provision of appropriate statistics that show a record of each call to each global category domain, the subscriber to which that call was allocated, and the reason for the allocation. If allocations can be shown to deviate from the intended distributions, adjustments may be made with subscribers accordingly.

To protect its interests, the providing company must supply the subscribers with a disclaimer to the effect that the number of calls in a domain must meet specific tests of statistical significance before adjustments will be made. This means that some 'play' must be accommodated in any discrepancy of call distribution; for example, if only three calls arrive in a domain within the billing period, and there exist four or more subscribers in that domain, then the distribution of calls obviously lacks statistical significance.

What is claimed is:

1. A method of providing information to a caller from a first party, comprising:

receiving a request for information relating to a particular industry;

referencing a database of third parties associated with the particular industry;

prioritizing the third parties within the database according to a predetermined formula based in part upon amounts paid to be first party by the third parties;

selecting a third party by the first party from the database according to the prioritizing; and delivering the information about the selected third party to the caller.

2. The method of claim 1 further comprising automatically connecting the caller to the selected third party.

3. The method of claim 1 further comprising prioritizing the third parties based upon time criteria provided by the third parties.

4. The method of claim 1 further comprising prioritizing the third parties based upon geographical criteria provided by the third parties.

5. The method of claim 1 wherein selecting a third party from the database according to the prioritizing comprises pseudorandomly selecting a third party according to a weight that is based in part on said prioritizing.

6. The method of claim 5 wherein selecting a third party from the database according to the prioritizing comprises selecting third parties at a controlled frequency.

7. The method of claim 1 further comprising querying the caller to determine the request for information.

8. The method of claim 1 wherein receiving a request for information comprises receiving an audible request; and wherein delivering the information comprises delivering the information audibly.

9. A system for providing information to a caller from a first party, comprising an interface and a control system associated with the interface and adapted to:

receive a request for information relating to a particular industry;

reference a database of third parties associated with the particular industry;

prioritize the third parties within the database according to a predetermined formula based in part upon amounts paid to the first party by the third parties;

select a third party by the first party from the database according to the prioritizing; and deliver the information about the selected third party to the caller.

10. A system for providing information from a first party to a caller about a third party, said system comprising:

a database comprising entries of third parties, said entries comprising information about the third parties including contact information and industry information;

a receiver adapted to receive a request from the caller asking for information for a third party within a given industry;

logic adapted to reference the database and the industry information and select a third party by the first party based on the industry information and a pseudorandom process in which the pseudorandom process is weighted based on amounts paid by the third parties to be listed within the database; and a transmitter to provide the contact information to the caller.

11. The system of claim 10 wherein said transmitter is adapted to connect automatically the caller with the selected third party.

12. The system of claim 10 wherein said logic selects third parties at a controlled frequency.

13. The system of claim 10 wherein said logic selects third parties based in part upon the time of day.

14. The system of claim 10 wherein said logic selects third parties based in part upon geographical information.

15. The system of claim 10 wherein said receiver and transmitter are associated with a communication network, said communication network comprising at least one of a public switched telephone network, a private computer network, a public computer network, the Internet, and the World Wide Web.

16. The system of claim 15 wherein the communication network comprises a public switched telephone network and is capable of conferencing the caller with the selected third party.

17. The system of claim 10 wherein said receiver is further adapted to query the caller to determine the industry.

18. The system of claim 10 wherein the receiver is adapted to receive an audible request and the transmitter is adapted to provide the contact information to the caller audibly.

19. The system of claim 10 wherein the logic is adapted to select only one third party from the database and the transmitter provides the contact information of only the selected third party to the caller.

* * * * *

UNITED STATES PATENT AND TRADEMARK OFFICE
CERTIFICATE OF CORRECTION

| | |
|---|---|
| PATENT NO. | : 6,526,135 B1 |
| APPLICATION NO. | : 09/195774 |
| DATED | : February 25, 2003 |
| INVENTOR(S) | : Dana W. Paxson |

It is certified that error appears in the above-identified patent and that said Letters Patent is hereby corrected as shown below:

Col. 13, claim 1, line 9, replace "be" with --the--.

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,526,135 B1 | Page 1 of 1 |
| APPLICATION NO. | : 09/195774 | |
| DATED | : February 25, 2003 | |
| INVENTOR(S) | : Dana W. Paxson | |

It is certified that error appears in the above-identified patent and that said Letters Patent is hereby corrected as shown below:

Claim 1:
Column 14, after Line 2: insert the following text:

--wherein selecting a third party from the database according to the prioritizing comprises selecting only one third party from the database; and wherein delivering the information about the selected third party comprises delivering the information about the selected only one third party to the caller.--

Claim 9:
Column 14, after Line 42: insert the following text:

--wherein selecting a third party from the database according to the prioritizing comprises selecting only one third party from the database; and wherein delivering the information about the selected third party comprises delivering the information about the selected only one third party to the caller.--

Claim 10:
Column 14, Line 60: insert the following text:

--wherein selecting a third party from the database according to the prioritizing comprises selecting only one third party from the database; and wherein delivering the information about the selected third party comprises delivering the information about the selected only one third party to the caller.--

Signed and Sealed this

Twenty-ninth Day of June, 2010

David J. Kappos
*Director of the United States Patent and Trademark Office*